US012620655B2

(12) United States Patent
Kim et al.

(10) Patent No.: US 12,620,655 B2
(45) Date of Patent: May 5, 2026

(54) POUCH FILM LAMINATE, POUCH TYPE BATTERY CASE, AND POUCH TYPE SECONDARY BATTERY

(71) Applicant: LG Energy Solution, Ltd., Seoul (KR)

(72) Inventors: Sang Hun Kim, Daejeon (KR); Min Hyeong Kang, Daejeon (KR); Hyung Kyun Yu, Daejeon (KR); Soo Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 562 days.

(21) Appl. No.: 17/926,670

(22) PCT Filed: Jun. 8, 2021

(86) PCT No.: PCT/KR2021/007175
§ 371 (c)(1),
(2) Date: Nov. 21, 2022

(87) PCT Pub. No.: WO2021/251736
PCT Pub. Date: Dec. 16, 2021

(65) Prior Publication Data
US 2023/0207931 A1 Jun. 29, 2023

(30) Foreign Application Priority Data
Jun. 9, 2020 (KR) ........................ 10-2020-0069917

(51) Int. Cl.
*H01M 50/129* (2021.01)
*B32B 7/12* (2006.01)
(Continued)

(52) U.S. Cl.
CPC ............. *H01M 50/129* (2021.01); *B32B 7/12* (2013.01); *B32B 15/085* (2013.01);
(Continued)

(58) Field of Classification Search
None
See application file for complete search history.

(56) References Cited

U.S. PATENT DOCUMENTS 7,285,334 B1 10/2007 Yamashita et al.
11,682,808 B2 * 6/2023 Oh ...................... H01M 50/136
429/163
(Continued)

FOREIGN PATENT DOCUMENTS

CN 109428015 A 3/2019
CN 111108621 A 5/2020
(Continued)

OTHER PUBLICATIONS

International Search Report for PCT/KR2021/007175 mailed Sep. 16, 2021. 3 pgs.
(Continued)

*Primary Examiner* — Kevin M Bernatz
(74) *Attorney, Agent, or Firm* — Lerner David LLP

(57) ABSTRACT

A pouch film laminate for preparing a pouch type battery case accommodating an electrode assembly is provided. The pouch film laminate includes a sealant layer formed of a first polymer as an innermost layer, a surface protection layer formed of a second polymer as an outermost layer, an aluminum alloy thin film having a grain size of 10 μm to 13 μm, and a gas barrier layer laminated between the surface protection layer and the sealant layer, wherein the gas barrier layer has a thickness of 50 μm to 70 μm, and the sealant layer has a thickness of 70 μm to 100 μm.

17 Claims, 3 Drawing Sheets

(51) Int. Cl.

| | |
|---|---|
| *B32B 15/085* | (2006.01) |
| *B32B 15/088* | (2006.01) |
| *B32B 15/09* | (2006.01) |
| *B32B 15/20* | (2006.01) |
| *B32B 27/08* | (2006.01) |
| *B32B 27/32* | (2006.01) |
| *B32B 27/34* | (2006.01) |
| *B32B 27/36* | (2006.01) |
| *H01M 50/105* | (2021.01) |
| *H01M 50/119* | (2021.01) |
| *H01M 50/121* | (2021.01) |
| *H01M 50/133* | (2021.01) |

(52) U.S. Cl.
CPC ............ *B32B 15/088* (2013.01); *B32B 15/09* (2013.01); *B32B 15/20* (2013.01); *B32B 27/08* (2013.01); *B32B 27/32* (2013.01); *B32B 27/34* (2013.01); *B32B 27/36* (2013.01); *H01M 50/105* (2021.01); *H01M 50/119* (2021.01); *H01M 50/121* (2021.01); *H01M 50/133* (2021.01); *B32B 2307/54* (2013.01); *B32B 2307/558* (2013.01); *B32B 2307/7242* (2013.01); *B32B 2307/732* (2013.01); *B32B 2457/10* (2013.01); *B32B 2553/00* (2013.01)

(56) References Cited

U.S. PATENT DOCUMENTS

| | | | | |
|---|---|---|---|---|
| 11,990,629 | B2 * | 5/2024 | Yasuda | ................... H01G 11/78 |
| 2004/0142190 | A1 | 7/2004 | Kawai et al. | |
| 2015/0203941 | A1 * | 7/2015 | Seki | ........................ C22C 21/00 |
| | | | | 148/692 |
| 2017/0256758 | A1 | 9/2017 | Kawakita | |
| 2018/0312943 | A1 | 11/2018 | Amano et al. | |
| 2019/0148682 | A1 | 5/2019 | Ojiri et al. | |
| 2020/0243810 | A1 | 7/2020 | Yamashita et al. | |
| 2020/0403194 | A1 | 12/2020 | Amano et al. | |
| 2021/0083233 | A1 | 3/2021 | Kim et al. | |
| 2022/0013306 | A1 | 1/2022 | Yasuda et al. | |
| 2022/0320635 | A1 * | 10/2022 | Oh | ....................... H01M 50/131 |
| 2023/0089546 | A1 * | 3/2023 | Kim | ..................... H01M 50/133 |
| | | | | 429/176 |
| 2023/0207931 | A1 | 6/2023 | Kim et al. | |
| 2023/0318093 | A1 * | 10/2023 | Oh | ......................... B32B 15/09 |
| | | | | 429/185 |
| 2023/0352773 | A1 * | 11/2023 | Oh | ....................... H01M 50/129 |
| 2023/0361389 | A1 * | 11/2023 | Oh | ......................... B32B 15/20 |
| 2024/0014472 | A1 * | 1/2024 | Oh | ........................ B32B 15/085 |
| 2024/0039088 | A1 * | 2/2024 | Oh | ......................... B32B 27/304 |
| 2024/0421391 | A1 * | 12/2024 | Hwang | ............... H01M 50/133 |
| 2025/0062451 | A1 * | 2/2025 | Kang | .................. H01M 50/133 |

FOREIGN PATENT DOCUMENTS

| | | | | |
|---|---|---|---|---|
| JP | 2002056823 | A | | 2/2002 |
| JP | 2002187233 | A | | 7/2002 |
| JP | 2005056729 | A | | 3/2005 |
| JP | 2007005156 | A | | 1/2007 |
| JP | 2011165455 | A | | 8/2011 |
| JP | 2011181394 | A | | 9/2011 |
| JP | 2012203985 | A | | 10/2012 |
| JP | 2013161594 | A | | 8/2013 |
| JP | 2014047372 | A | † | 3/2014 |
| JP | 2014175215 | A | | 9/2014 |
| JP | 2014175216 | A | | 9/2014 |
| JP | 2015026438 | A | | 2/2015 |
| JP | 2017076532 | A | | 4/2017 |
| JP | 2017084786 | A | | 5/2017 |
| JP | 2017084787 | A | | 5/2017 |
| JP | 2017136756 | A | | 8/2017 |
| JP | 2017-157532 | A | | 9/2017 |
| JP | 2017157432 | A | † | 9/2017 |
| JP | 2018187819 | A | | 11/2018 |
| JP | 2019038183 | A | | 3/2019 |
| JP | 6648863 | B2 | | 2/2020 |
| JP | 2023526609 | A | | 6/2023 |
| KR | 20010052645 | A | | 6/2001 |
| KR | 20030014351 | A | | 2/2003 |
| KR | 20110023438 | A | | 3/2011 |
| KR | 20130011976 | A | | 1/2013 |
| KR | 20150008474 | A | | 1/2015 |
| KR | 20150046067 | A | | 4/2015 |
| KR | 20170102813 | A | | 9/2017 |
| KR | 20170142624 | A | | 12/2017 |
| KR | 20200025101 | A | | 3/2020 |
| WO | 0157941 | A1 | | 8/2001 |
| WO | 2013168606 | A1 | | 11/2013 |
| WO | 2017179712 | A1 | | 10/2017 |
| WO | 2019066072 | A1 | | 4/2019 |
| WO | 2019124281 | A1 | | 6/2019 |
| WO | 2020085189 | A1 | | 4/2020 |
| WO | 2020085462 | A1 | † | 9/2021 |

OTHER PUBLICATIONS

Search Report dated Nov. 11, 2022 from the Office Action for Chinese Application No. 202110614690.X issued Nov. 21, 2022, 2 pages. [See p. 1, categorizing the cited references].
Extended European Search Report including Written Opinion for Application No. 21821349.4 dated Nov. 11, 2024, 8 pages.

* cited by examiner
† cited by third party

[FIG. 1]
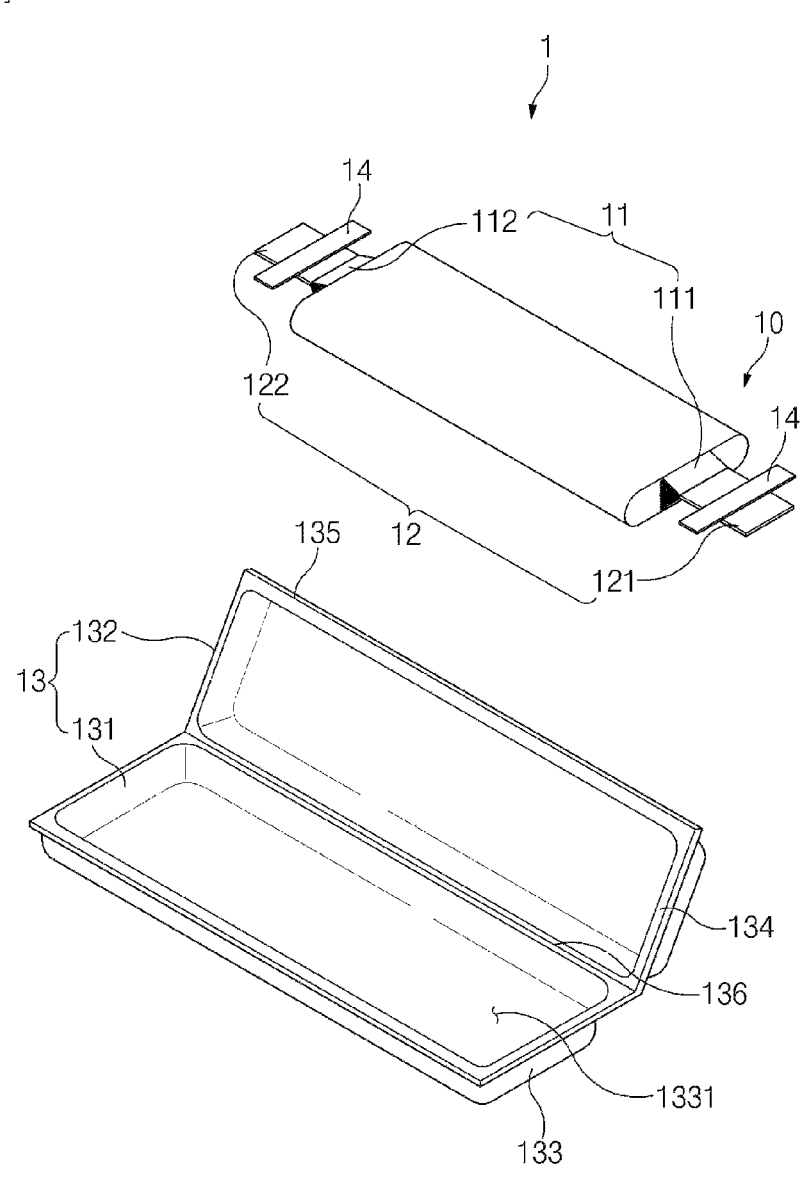

[FIG. 2]
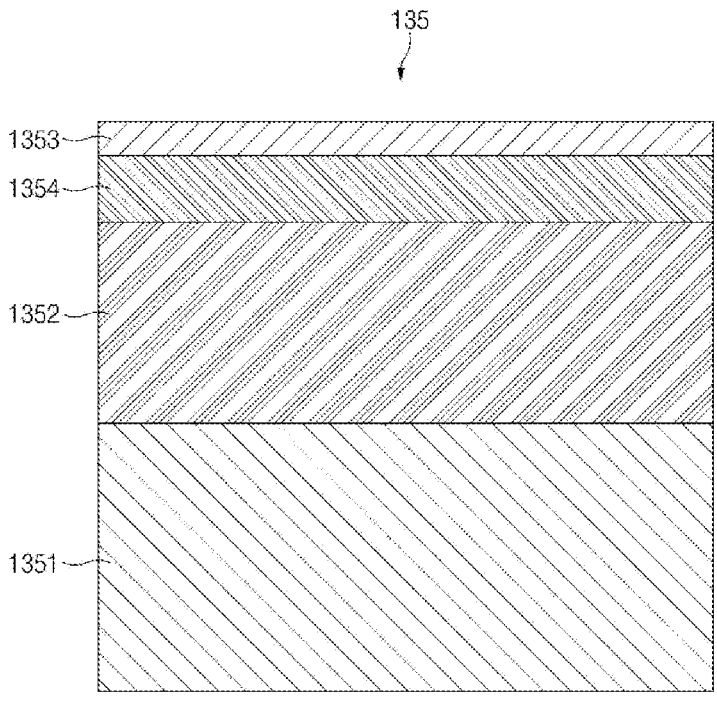
[FIG. 3]
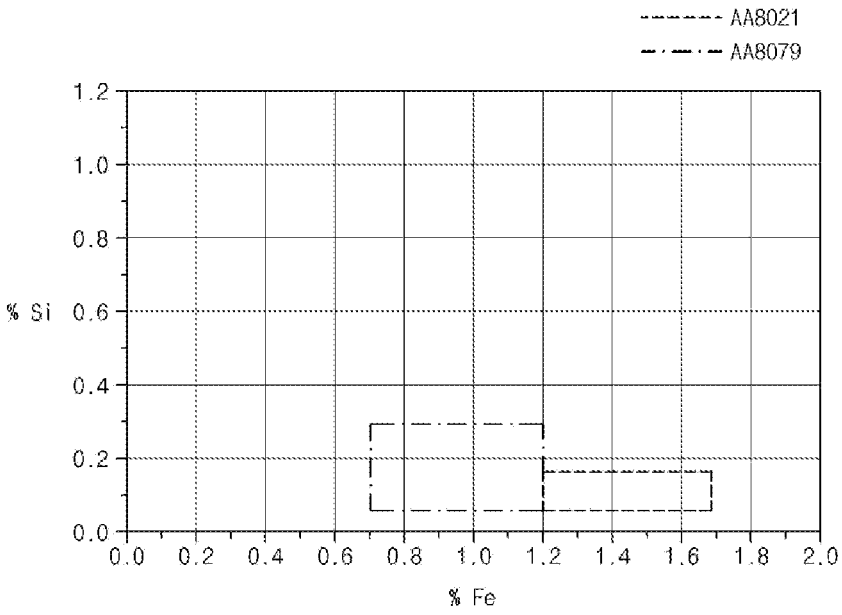

[FIG. 4]
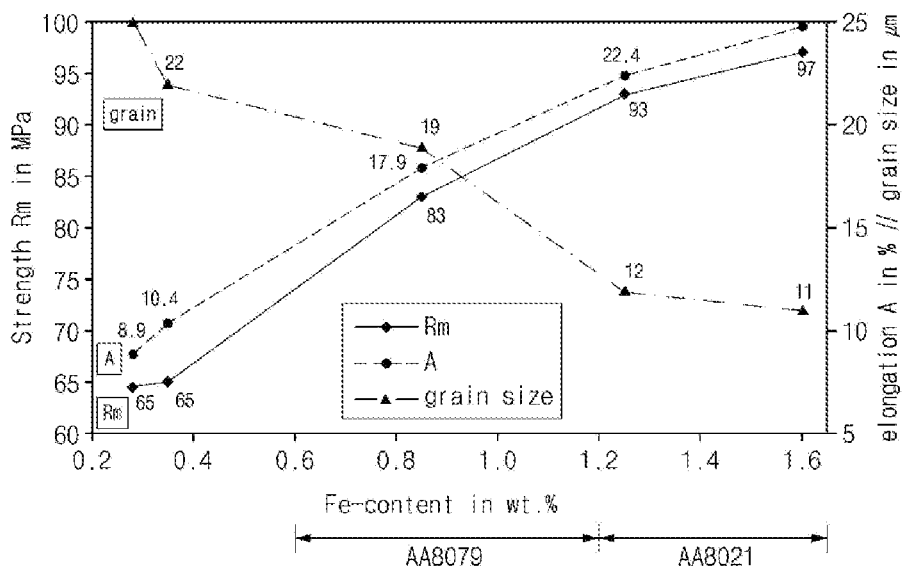
[FIG. 5]
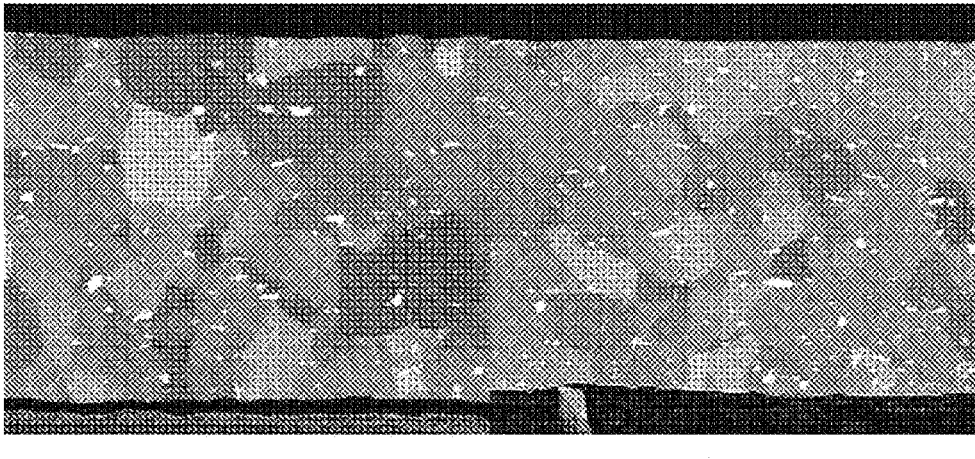
AA8079                    AA8021

POUCH FILM LAMINATE, POUCH TYPE BATTERY CASE, AND POUCH TYPE SECONDARY BATTERY

CROSS-REFERENCE TO RELATED APPLICATIONS

This application is a national stage entry under 35 U.S.C. § 371 of International Application No. PCT/KR2021/007175 filed on Jun. 8, 2021, which claims priority from Korean Patent Application No. 10-2020-0069917, filed on Jun. 9, 2020, the disclosures of which are incorporated by reference herein.

TECHNICAL FIELD

The present invention relates to a pouch film laminate, a pouch type battery case, and a pouch type secondary battery, and more particularly, to a pouch film laminate in which formability is improved by improving tensile strength and elongation, a pouch type battery case, and a pouch type secondary battery.

BACKGROUND ART

In general, types of secondary batteries include a nickel cadmium battery, a nickel hydride battery, a lithium ion battery, and a lithium ion polymer battery. These secondary batteries are not only applied and used in small products such as digital cameras, P-DVDs, MP3Ps, mobile phones, PDAs, portable game devices, power tools, and E-bikes, but are also applied and used in large products requiring high output, such as electric vehicles and hybrid vehicles, and a power storage device and a power storage device for backup which store surplus generated power or renewable energy.

In order to prepare such a secondary battery, first, a positive electrode collector and a negative electrode collector are respectively coated with electrode active material slurries to prepare a positive electrode and a negative electrode, and the positive electrode and the negative electrode are then stacked on both sides of a separator to form an electrode assembly having a predetermined shape. Then, after the electrode assembly is accommodated in a battery case and an electrolyte solution is injected, the battery case is sealed.

The secondary battery is classified into a pouch type, a can type, and the like, according to a material of a case for accommodating the electrode assembly. The pouch type accommodates the electrode assembly in a pouch formed of a flexible polymer material. In addition, the can type accommodates the electrode assembly in a case formed of a material such as metal or plastic.

The pouch, which is a case of the pouch type secondary battery, is prepared by press working of a flexible pouch film laminate to form a cup portion. Then, when the cup portion is formed, the electrode assembly is accommodated in an accommodating space of the cup portion and a sealing portion is sealed to prepare a secondary battery.

Drawing in the press working is performed by inserting the pouch film laminate into press equipment and applying a pressure to the pouch film laminate with a punch to stretch the pouch film laminate. The pouch film laminate is generally composed of a plurality of layers in which a polymer film, such as polyethylene terephthalate, is laminated on one surface of a metal gas barrier layer and a sealant layer is laminated on the other surface thereof, and an about 40 μm thick aluminum alloy thin film is mainly used as the gas barrier layer. However, such a conventional pouch film laminate had a limitation in forming a deeper cup portion due to low formability, and also had a limitation in reducing a radius of filleting when edges of a bottom portion and edges of an open portion of the cup portion are filleted. Furthermore, the conventional pouch film laminate had a limitation in forming an outer wall of the cup portion close to vertical. Accordingly, there was a problem in that a dead space of the secondary battery was increased and a size of the electrode assembly was decreased to reduce energy efficiency to volume.

DISCLOSURE OF THE INVENTION

Technical Problem

An aspect of the present invention provides a pouch film laminate, in which formability is excellent by improving tensile strength and elongation, a pouch type battery case, and a pouch type secondary battery.

The object of the present invention is not limited to the aforesaid, but other objects not described herein will be clearly understood by those skilled in the art from descriptions below.

Technical Solution

According to an aspect of the present invention, there is provided a pouch film laminate including: a sealant layer formed of a first polymer as an innermost layer; a surface protection layer formed of a second polymer as an outermost layer; an aluminum alloy thin film having a grain size of 10 μm to 13 μm, and a gas barrier layer laminated between the surface protection layer and the sealant layer, wherein the gas barrier layer has a thickness of 50 μm to 70 μm, and the sealant layer has a thickness of 70 μm to 100 μm.

Also, the aluminum alloy thin film may be an aluminum alloy thin film with alloy number AA8021.

Furthermore, the aluminum alloy thin film may include iron in an amount of 1.3 wt % to 1.7 wt %.

Also, the aluminum alloy thin film may include silicon in an amount of 0.2 wt % or less.

Furthermore, the gas barrier layer may have a thickness of 55 μm to 65 μm.

Also, the sealant layer may have a thickness of 75 μm to 85 μm.

Furthermore, the first polymer may include polypropylene (PP).

Also, the surface protection layer may have a thickness of 5 μm to 25 μm.

Furthermore, the surface protection layer may have a thickness of 7 μm to 12 μm.

Also, the second polymer may include polyethylene terephthalate (PET).

Furthermore, the pouch film laminate may further include a drawing assistance layer which is formed of a third polymer and is laminated between the surface protection layer and the gas barrier layer.

Also, the drawing assistance layer may have a thickness of 20 μm to 50 μm.

Furthermore, the drawing assistance layer may have a thickness of 25 μm to 38 μm.

Also, a thickness ratio of the drawing assistance layer to the gas barrier layer may be in a range of 1:1.5 to 1:2.5.

Furthermore, the third polymer may include Nylon.

Also, the pouch film laminate may have a total thickness of 160 μm to 200 μm, preferably 170 μm to 200 μm, and more preferably 180 μm to 200 μm. Furthermore, the pouch film laminate may have a tensile strength, which is measured while the pouch film laminate is pulled at a tensile speed of 50 mm/min after being cut to a size of 15 mm×80 mm, of 200 N/15 mm to 300 N/15 mm, and may have an elongation of 120% to 150%.

According to another aspect of the present invention, there is provided a pouch type battery case accommodating an electrode assembly and being prepared by forming a pouch film laminate, wherein the pouch film laminate includes a sealant layer formed of a first polymer as an innermost layer; a surface protection layer formed of a second polymer as an outermost layer; an aluminum alloy thin film having a grain size of 10 μm to 13 μm, and a gas barrier layer laminated between the surface protection layer and the sealant layer, wherein the gas barrier layer has a thickness of 50 μm to 70 μm, and the sealant layer has a thickness of 70 μm to 100 μm.

According to another aspect of the present invention, there is provided a pouch type secondary battery including an electrode assembly which is formed by stacking a positive electrode, a separator, and a negative electrode; and a pouch type battery case accommodating the electrode assembly, wherein the battery case is prepared by forming a pouch film laminate, wherein the pouch film laminate includes a sealant layer formed of a first polymer as an innermost layer; a surface protection layer formed of a second polymer as an outermost layer; an aluminum alloy thin film having a grain size of 10 μm to 13 μm, and a gas barrier layer laminated between the surface protection layer and the sealant layer, wherein the gas barrier layer has a thickness of 50 μm to 70 μm, and the sealant layer has a thickness of 70 μm to 100 μm.

Other specific details of the present invention are included in the detailed description and drawings.

Advantageous Effects

According to the embodiments of the present invention, at least the following effects may be achieved.

Since a gas barrier layer and a sealant layer satisfy a specific thickness and an aluminum alloy thin film having a specific grain size is used as a gas barrier layer, a pouch film laminate according to the present invention has excellent tensile strength, elongation, and toughness. Accordingly, if the pouch film laminate of the present invention is used, since a forming depth may be increased without occurrence of pinholes or cracks during forming of a cup portion, particularly, two cup portions and a radius of curvature of an edge of the cup portion may be reduced, an accommodating space volume of a battery assembly may be increased. The effects according to the present invention are not limited to the contents as exemplified above, but more various effects are included in the specification.

BRIEF DESCRIPTION OF THE DRAWINGS

FIG. 1 is an assembly view of a secondary battery according to an embodiment of the present invention;
FIG. 2 is a cross-sectional view of a pouch film laminate according to an embodiment of the present invention;
FIG. 3 is a graph illustrating iron and silicon contents of an aluminum alloy with alloy number AA8079 and an aluminum alloy with alloy number AA8021;
FIG. 4 is a graph illustrating changes in tensile strength, elongation, and grain size according to the iron content of the aluminum alloy with alloy number AA8079 and the aluminum alloy with alloy number AA8021; and
FIG. 5 is magnified scanning electron microscope (SEM) images of grains of the aluminum alloy with alloy number AA8021 and the aluminum alloy with alloy number AA8079.

MODE FOR CARRYING OUT THE INVENTION

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless defined otherwise, all terms (including technical and scientific terms) used herein may be intended to have meanings understood by those skilled in the art. In addition, terms defined in general dictionaries should not be interpreted abnormally or exaggeratedly, unless clearly specifically defined.

The terminology used herein is for the purpose of describing particular example embodiments only and is not intended to be limiting of the present invention. In the specification, the terms of a singular form may include plural forms unless referred to the contrary. It will be further understood that the terms "comprises" and/or "comprising" when used in this specification, specify the presence of stated components, but do not preclude the presence or addition of one or more other components.

Hereinafter, preferred embodiments of the present invention will be described in detail with reference to the accompanying drawings.

FIG. 1 is an assembly view of a secondary battery 1 according to an embodiment of the present invention.

According to an embodiment of the present invention, since toughness is increased by improving tensile strength and elongation of a pouch film laminate 135, formability may be improved when the pouch film laminate 135 is formed to prepare a pouch type battery case 13.

The pouch film laminate 135 according to an embodiment of the present invention includes a sealant layer 1351 formed of a first polymer as an innermost layer; a surface protection layer 1353 formed of a second polymer as an outermost layer; an aluminum alloy thin film having a grain size of 10 μm to 13 μm, and a gas barrier layer 1352 laminated between the surface protection layer 1353 and the sealant layer 1351. In this case, the gas barrier layer 1352 has a thickness of 50 μm to 70 μm, and the sealant layer 1351 has a thickness of 70 μm to 100 μm. Particularly, it is desirable that the gas barrier layer 1352 has a thickness of 55 μm to 65 μm, and the sealant layer 1351 has a thickness of 75 μm to 85 μm.

The pouch type battery case 13 according to an embodiment of the present invention accommodating an electrode assembly 10 and being prepared by forming the pouch film laminate 135, wherein the pouch film laminate 135 includes the sealant layer 1351 formed of a first polymer as an innermost layer; the surface protection layer 1353 formed of a second polymer as an outermost layer; an aluminum alloy thin film having a grain size of 10 μm to 13 μm, and the gas barrier layer 1352 laminated between the surface protection layer 1353 and the sealant layer 1351, wherein the gas barrier layer 1352 has a thickness of 50 μm to 70 μm, and the sealant layer has a thickness of 70 μm to 100 μm. Particularly, it is desirable that the gas barrier layer 1352 has a thickness of 55 μm to 65 μm, and the sealant layer has a thickness of 75 μm to 85 μm.

The secondary battery 1 according to the embodiment of the present invention includes the electrode assembly 10 which is formed by stacking a positive electrode, a separator, and a negative electrode; and the pouch type battery case 13 accommodating the electrode assembly 10, wherein the battery case 13 is prepared by forming the pouch film laminate 135, and the pouch film laminate 135 includes the sealant layer 1351 formed of a first polymer as an innermost layer; the surface protection layer 1353 formed of a second polymer as an outermost layer; an aluminum alloy thin film having a grain size of 10 μm to 13 μm, and the gas barrier layer 1352 laminated between the surface protection layer 1353 and the sealant layer 1351, wherein the gas barrier layer 1352 has a thickness of 50 μm to 70 μm, and the sealant layer 1351 has a thickness of 70 p m to 100 μm. Particularly, it is desirable that the gas barrier layer 1352 has a thickness of 55 μm to 65 μm, and the sealant layer 1351 has a thickness of 75 μm to 85 μm.

The electrode assembly 10 is formed by alternatingly stacking an electrode and a separator. First, a slurry, in which an electrode active material, a binder, and/or a conductive agent are mixed, is applied to a positive electrode collector and a negative electrode collector to prepare a positive electrode and a negative electrode, and, after the electrode assembly 10 having a predetermined shape is formed by stacking the positive electrode and the negative electrode on both sides of the separator, the electrode assembly 10 is inserted into the battery case 13, and the battery case 13 is sealed after injecting an electrolyte.

Specifically, the electrode assembly 10 includes two types of electrodes, such as the positive electrode and the negative electrode, and the separator disposed between the electrodes to insulate the electrodes from each other. The electrode assembly 10 includes a stacked type, a jelly-roll-type, and a stack and folding type. The two types of electrodes, that is, the positive electrode and the negative electrode, have a structure in which active material slurries are applied to electrode collectors in the form of a metal foil or metal mesh including aluminum and copper, respectively. The slurry may be typically formed by stirring a granular active material, an auxiliary conductor, a binder, and a conductive agent in a state in which a solvent is added. The solvent is removed in a subsequent process.

As illustrated in FIG. 1, the electrode assembly 10 includes an electrode tab 11. The electrode tab 11 is connected to each of the positive electrode and the negative electrode of the electrode assembly 10 and protrudes from the electrode assembly 10 to the outside so that it becomes a path through which electrons may move between the inside and the outside of the electrode assembly 10. The current collector of the electrode assembly 10 is composed of a portion to which the electrode active material is applied and an end portion to which the electrode active material is not applied, that is, an uncoated portion. The electrode tab 11 may be formed by cutting the uncoated portion or may be formed by connecting a separate conductive member to the uncoated portion by ultrasonic welding or the like. As illustrated in FIG. 1, the electrode tabs 11 may protrude in different directions of the electrode assembly 10, respectively, but are not limited thereto and may be formed to protrude in various directions, for example, the electrode tabs 11 protrude side by side from one side of the electrode assembly 10 in the same direction.

An electrode lead 12 for supplying electricity to the outside of the secondary battery 1 is connected to the electrode tab 11 of the electrode assembly 10 by spot welding or the like. In addition, a portion of the electrode lead 12 is surrounded by an insulating portion 14. The insulating portion 14 is limitedly located at a sealing portion 134, to which a first case 131 and a second case 132 of the battery case 13 are thermally fused, to adhere the electrode lead 12 to the battery case 13. In addition, the insulating portion 14 prevents flow of electricity generated from the electrode assembly 10 to the battery case 13 through the electrode lead 12, and maintains sealing of the battery case 13. Thus, the insulating portion 14 is formed of an insulator having non-conductivity which does not conduct electricity well. In general, as the insulating portion 14, an insulating tape, which is easy to be attached to the electrode lead 12 and is relatively thin, is widely used, but the present invention is not limited thereto and various members may be used as long as they may insulate the electrode lead 12.

One end of the electrode lead 12 is connected to the electrode tab 11, and the other end thereof protrudes to the outside of the battery case 13. That is, the electrode lead 12 includes a positive electrode lead 121, which has one end connected to a positive electrode tab 111 and extends in a protruding direction of the positive electrode tab 111, and a negative electrode lead 122 which has one end connected to a negative electrode tab 112 and extends in a protruding direction of the negative electrode tab 112. As illustrated in FIG. 1, the other ends of both of the positive electrode lead 121 and the negative electrode lead 122 protrude to the outside of the battery case 13. Accordingly, the electricity generated inside the electrode assembly 10 may be supplied to the outside. Also, since the positive electrode tab 111 and the negative electrode tab 112 are formed to respectively protrude in various directions, the positive electrode lead 121 and the negative electrode lead 122 may also respectively extend in various directions.

Materials of the positive electrode lead 121 and the negative electrode lead 122 may be different from each other. That is, the positive electrode lead 121 may be formed of an aluminum (Al) material that is the same as the positive electrode collector, and the negative electrode lead 122 may be formed of a copper (Cu) material or nickel (Ni)-coated copper material that is the same as the negative electrode collector. Since a portion of the electrode lead 12 protruding to the outside of the battery case 13 becomes a terminal portion, it is electrically connected to an external terminal.

The battery case 13 is a pouch formed of a flexible material which accommodates the electrode assembly 10 therein. Hereinafter, the battery case 13 will be described as a pouch. If the pouch film laminate 135 having flexibility is drawn by using a punch or the like, a portion is stretched to form a cup portion 133 including a pocket-shaped accommodation space 1331, and thus, the battery case 13 is prepared.

The battery case 13 accommodates the electrode assembly 10 so that the portion of the electrode lead 12, that is, the terminal portion is exposed and is sealed. As illustrated in FIG. 1, the battery case 13 includes the first case 131 and the second case 132. The cup portion 133 is formed in the first case 131 to provide the accommodation space 1331 capable of accommodating the electrode assembly 10, and the second case 132 covers the accommodation space 1331 from the top so that the electrode assembly 10 is not separated to the outside of the battery case 13. The first case 131 and the second case 132 may be prepared by connecting one sides thereof to each other as illustrated in FIG. 1, but the present invention is not limited thereto and the first case 131 and the second case 132 may be prepared in various ways, for example, the first case 131 and the second case 132 are separated from each other and prepared separately.

When the cup portion 133 is formed on the pouch film laminate 135, the two symmetrical cup portions 133 may be drawn adjacent to each other on one pouch film laminate 135. Then, as illustrated in FIG. 1, the cup portions 133 are formed in the first case 131 and the second case 132, respectively. After the electrode assembly 10 is accommodated in the accommodation space 1331 provided in the cup portion 133 of the first case 131, a bridge 136 formed between the two cup portions 133 in the battery case 13 may be folded so that the two cup portions 133 face each other. Then, the cup portion 133 of the second case 132 also accommodates the electrode assembly 10 from above. Thus, since the two cup portions 133 accommodate the one electrode assembly 10, the electrode assembly 10 having a thickness greater than that when the cup portion 133 is one may also be accommodated. Also, since one edge of the secondary battery 1 is formed by folding the battery case 13, the number of edges to be sealed may be reduced when a sealing process is performed later. Therefore, a process speed may be improved, and the number of sealing processes may be reduced.

When the electrode lead 12 is connected to the electrode tab 11 of the electrode assembly 10 and the insulating portion 14 is formed on the portion of the electrode lead 12, the electrode assembly 10 is accommodated in the accommodation space 1331 provided in the cup portion 133 of the first case 131, and the second case 132 covers the space from the top. Then, an electrolyte is injected therein and the sealing portion 134 formed on edges of the first case 131 and the second case 132 is sealed. The electrolyte is to move lithium ions which are generated by an electrochemical reaction of the electrode during charge and discharge of the secondary battery 1, wherein it may include a non-aqueous organic electrolyte solution, which is a mixture of a lithium salt and organic solvents, or a polymer using a polymer electrolyte. Furthermore, the electrolyte may include a sulfide-based, oxide-based, or polymer-based solid electrolyte, and these solid electrolytes may have flexibility to be easily deformed by an external force. Through the above method, the pouch type secondary battery 1 may be prepared.

FIG. 2 is a cross-sectional view of the pouch film laminate 135 according to an embodiment of the present invention.

The pouch, as the battery case 13 of the pouch type secondary battery 1 according to the embodiment of the present invention, is prepared by drawing the pouch film laminate 135. That is, the battery case is prepared by stretching the pouch film laminate 135 with a punch or the like to form the cup portion 133. According to an embodiment of the present invention, the pouch film laminate 135, as illustrated in FIG. 2, includes the sealant layer 1351, the gas barrier layer 1352, the surface protection layer 1353, and a drawing assistance layer 1354.

The sealant layer 1351 is formed of a first polymer, and is formed as an innermost layer to be directly in contact with the electrode assembly 10. Herein, the innermost layer refers to a layer positioned at the end of the gas barrier layer 1352 in a direction in which the electrode assembly 10 is positioned. When the pouch film laminate 135 having the above-described laminate structure is drawn using a punch or the like, the pouch is prepared while a portion is stretched to form the cup portion 133 including the pocket-shaped accommodation space 1331. Then, the electrolyte is injected when the electrode assembly 10 is accommodated in the accommodation space 1331. Thereafter, if the first case 131 and the second case 132 are in contact with each other and the sealing portion 134 is thermally compressed, the sealant layers 1351 are adhered to each other to seal the pouch. In this case, the sealant layer 1351 must have insulation properties because it is directly in contact with the electrode assembly 10, and must have corrosion resistance because it is also in contact with the electrolyte. Also, since it is necessary to completely seal the inside to block material movement between the inside and the outside, it must have high sealing properties. That is, the sealing portion 134, in which the sealant layers 1351 are adhered to each other, must have excellent thermal adhesive strength. In general, the first polymer for preparing the sealant layer 1351 may be formed of at least one material selected from the group consisting of polyethylene, polypropylene, polycarbonate, polyethylene terephthalate, polyvinyl chloride, acrylic polymer, polyacrylonitrile, polyimide, polyamide, cellulose, aramid, Nylon, polyester, polyparaphenylene benzobisoxazole, polyarylate, Teflon, and glass fibers. Particularly, a polyolefin-based resin, such as polypropylene (PP) or polyethylene (PE), is mainly used. Since polypropylene (PP) has excellent mechanical properties, such as tensile strength, stiffness, surface hardness, wear resistance, and heat resistance, and chemical properties such as corrosion resistance, it is mainly used for preparing the sealant layer 1351. Furthermore, the sealant layer may also be composed of casted polypropylene, acid modified polypropylene, or a polypropylene-butylene-ethylene terpolymer. Herein, the acid modified polypropylene may be MAH PP (maleic anhydride polypropylene). Also, the sealant layer 1351 may have a single-layer structure formed of any one material or may have a composite layer structure which is formed by layering two or more materials, respectively.

According to an embodiment of the present invention, a thickness of the sealant layer 1351 may be in a range of 70 μm to 100 μm, and may particularly be in a range of 75 μm to 85 μm. If the thickness of the sealant layer 1351 is less than 70 μm, sealing durability may be reduced, for example, internal destruction occurs during sealing. If the thickness of the sealant layer is greater than 100 μm, since a total thickness of the pouch may be excessively increased, energy density to volume of the secondary battery 1 may be rather reduced.

A thickness of the sealant layer 1351 may be 1 time to 2 times, preferably 1.1 times to 1.8 times, and more preferably 1.2 times to 1.5 times a thickness of the gas barrier layer to be described later. When a thickness ratio of the sealant layer to the gas barrier layer satisfies the above range, a pouch film laminate having excellent sealing durability and formability may be obtained. In a case in which the thickness of the sealant layer is less than the thickness of the gas barrier layer, sealing durability and insulation properties may be adversely affected, and, if the thickness of the sealant layer is excessive large, the formability may be reduced, and the energy density may be reduced due to a decrease in the electrode assembly accommodation space.

The gas barrier layer 1352 is laminated between the surface protection layer 1353 and the sealant layer 1351 to secure mechanical strength of the pouch, block incoming and outgoing of gas or moisture from the outside of the secondary battery 1, and prevent leakage of the electrolyte. The gas barrier layer 1352 is formed of metal, and the gas barrier layer 1352 according to an embodiment of the present invention may particularly be formed of an aluminum alloy thin film having a grain size of 10 µm to 13 µm, preferably 10.5 µm to 12.5 µm, and more preferably 11 µm to 12 µm. Aluminum is light-weighted while securing more than a predetermined level of mechanical strength, may compensate for electrochemical properties by the electrode assembly 10 and the electrolyte, and may secure a heat dissipation property. The thickness of the gas barrier layer may be in a range of 50 µm to 70 µm, and may particularly be in a range of 55 µm to 65 µm.

Conventionally, the gas barrier layer was generally formed by using an aluminum alloy thin film having a thickness of about 30 µm to 50 µm, particularly 40 µm. In a case in which the thickness of the gas barrier layer was 30 µm to 50 µm, since the gas barrier layer may be broken when a depth of the cup portion 133 was increased during drawing, there was a limitation in increasing a forming depth. Also, it was difficult to form an outer wall of the cup portion 133 close to vertical, and there was a limitation in reducing a filleting radius of curvature of an edge of the cup portion 133.

If the thickness of the gas barrier layer is increased, an effect of increasing the forming depth may be obtained, but, in this case, since manufacturing costs are not only increased, but the total thickness of the pouch is also excessively increased, there is a problem in that the energy density to volume of the secondary battery 1 is reduced. Also, in a case in which only the thickness of the aluminum alloy thin film is increased, the forming depth may be increased, but, since pinholes or cracks occur in the aluminum alloy thin film after forming, a problem in the sealing durability occurs. Furthermore, if the thickness of the gas barrier layer is increased and the thickness of the sealant layer is decreased in order to reduce the total thickness of the pouch, there is a problem in that the sealing durability is reduced.

Thus, as a result of a significant amount of research, the present inventors have found that, in a case in which an aluminum alloy thin film having a specific grain size is used as a material of the gas barrier layer and the thicknesses of the gas barrier layer and the sealant layer are controlled within a specific range, the cup portion may be deeply formed and the sealing durability may also be maintained excellently, thereby leading to the completion of the present invention.

Specifically, the gas barrier layer 1352 according to the present invention includes an aluminum alloy thin film having a grain size of 10 µm to 13 µm, preferably 10.5 µm to 12.5 µm, and more preferably 11 µm to 12 µm. When the grain size of the aluminum alloy thin film satisfies the above range, the forming depth may be increased without occurrence of pinholes or cracks during cup forming. In a case in which the grain size of the aluminum alloy thin film is greater than 13 µm, since strength of the aluminum alloy thin film is decreased and dispersion of internal stress is difficult during stretching, the occurrence of pinholes or cracks increases, and, in a case in which the grain size of the aluminum alloy thin film is less than 10 µm, since flexibility of the aluminum alloy thin film is reduced, there is a limitation in improving the formability.

The grain size varies depending on a composition of the aluminum alloy thin film and a processing method of the aluminum alloy thin film, and may be measured by observing a cross section in a thickness direction of the aluminum alloy thin film with a scanning electron microscope (SEM). Specifically, in the present invention, a cross-sectional SEM image in the thickness direction of the aluminum alloy thin film was obtained using a scanning electron microscope, maximum diameters of 30 random grains among grains observed in the SEM image were measured, and an average value thereof was then evaluated as the grain size.

In the aluminum alloy thin film according to the present invention, a metallic element other than aluminum, for example, at least one selected from the group consisting of iron (Fe), copper (Cu), chromium (Cr), manganese (Mn), nickel (Ni), magnesium (Mg), silicon (Si), and zinc (Zn) may be included.

An iron (Fe) content of the aluminum alloy thin film may be in a range of 1.2 wt % to 1.7 wt %, preferably 1.3 wt % to 1.7 wt %, and more preferably 1.3 wt % to 1.45 wt %. In a case in which the iron (Fe) content in the aluminum alloy thin film is less than 1.2 wt %, the strength of the aluminum alloy thin film may be reduced to cause cracks and pinholes during forming, and, in a case in which the iron content is greater than 1.7 wt %, since the flexibility of the aluminum alloy thin film is reduced, there is a limitation in improving the formability.

Also, a silicon (Si) content of the aluminum alloy thin film may be in a range of 0.2 wt % or less, preferably 0.05 wt % to 0.2 wt %, and more preferably 0.08 wt % to 0.19 wt %, for example, 0.1 wt % to 1.18 wt %. In a case in which the silicon content is greater than 0.2 wt %, the formability may be reduced.

Specifically, the aluminum alloy thin film according to the present invention may be an aluminum alloy with alloy number AA8021.

FIG. 3 is a graph illustrating iron and silicon contents of an aluminum alloy with alloy number AA8079 and the aluminum alloy with alloy number AA8021.

Mechanical strength is improved when a large amount of iron is contained in an aluminum alloy, and flexibility is improved when a small amount of iron is contained. As illustrated in FIG. 3, alloy number AA8079 contains 0.6 wt % to 1.2 wt % of iron and 0.3 wt % or less of silicon. That is, in a case in which the gas barrier layer 1352 is prepared from the aluminum alloy of alloy number AA8079, since relatively little iron is contained, flexibility may be improved, but, since strength may be reduced, there may be a limitation in formability.

In contrast, as illustrated in FIG. 3, alloy number AA8021 among aluminum alloys may contain 1.2 wt % to 1.7 wt %, particularly 1.3 wt % to 1.7 wt % of iron, and 0.2 wt % or less of silicon. In a case in which the gas barrier layer 1352 is prepared from the aluminum alloy of alloy number AA8021, since iron is contained in a relatively large amount, tensile strength and elongation may be improved.

When a tensile force is applied to a certain material, a relationship between tensile strength and elongation may be expressed as a graph. In this case, if a vertical axis of the graph is the tensile strength and a horizontal axis is the elongation, an area under the graph is toughness of the corresponding material. The toughness refers to a degree of toughness against destruction of the material, wherein the higher the toughness is, the more the material may be elongated until it does not break.

Thus, in a case in which the gas barrier layer 1352 is prepared by using the aluminum alloy of alloy number AA8021, since the tensile strength and elongation are improved, the toughness may be increased and the formability may be improved.

FIG. 4 is a graph illustrating changes in tensile strength, elongation, and grain size according to the iron content of the aluminum alloy with alloy number AA8079 and the aluminum alloy with alloy number AA8021.

As illustrated in FIG. 4, AA8079 has low tensile strength and elongation so that there is a limitation in increasing the formability, and, since the grain size is relatively large at 13 μm to 21 μm, internal stress is less dispersed during stretching, and thus, there is a problem in that the number of pinholes is increased.

In contrast, since AA8021 has excellent formability due to its high tensile strength and elongation and has a relatively small grain size of 10 μm to 13 μm, the internal stress may be more dispersed during stretching, and thus, the occurrence of pinholes may be effectively suppressed. Thus, in a case in which the gas barrier layer 1352 is prepared by using the aluminum alloy of alloy number AA8021, a pouch film laminate having excellent formability and sealing durability may be prepared.

The thickness of the gas barrier layer 1352 may be in a range of 50 μm to 70 μm, and may particularly be in a range of 55 μm to 65 μm. In a case in which the thickness of the gas barrier layer satisfies the above range, since formability of the gas barrier layer 1352 is improved, the cup portion 133 may be formed deep when the pouch film laminate 135 is drawn, the outer wall of the cup portion 133 is close to vertical, and the radius of curvature of the edge of the cup portion 133 may also be reduced. Then, since a volume of the accommodation space 1331 is increased, more electrodes and separators may be stacked in the electrode assembly 10 accommodated therein and energy efficiency to volume may be increased. In addition, the total thickness of the pouch is not significantly increased without reducing the thickness of the sealant layer 1351 while the manufacturing costs are not significantly increased, and the sealing durability may also not be reduced.

The surface protection layer 1353 is formed of a second polymer, and is formed as an outermost layer to electrically insulate the electrode assembly 10 from the outside while protecting the secondary battery 1 from friction and collision with the outside. Herein, the outermost layer refers to a layer positioned at the end of the gas barrier layer 1352 in a direction opposite to the direction in which the electrode assembly 10 is positioned. The second polymer for preparing the surface protection layer 1353 may be at least one material selected from the group consisting of polyethylene, polypropylene, polycarbonate, polyethylene terephthalate, polyvinyl chloride, acrylic polymer, polyacrylonitrile, polyimide, polyamide, cellulose, aramid, Nylon, polyester, polyparaphenylene benzobisoxazole, polyarylate, Teflon, and glass fibers. Particularly, it is desirable that a polymer, such as polyethylene terephthalate (PET) having wear resistance and heat resistance, is mainly used. The surface protection layer 1353 may have a single-layer structure formed of any one material or may have a composite layer structure which is formed by layering two or more materials, respectively.

According to an embodiment of the present invention, a thickness of the surface protection layer 1353 may be in a range of 5 μm to 25 μm, and may particularly be in a range of 7 μm to 12 μm. If the thickness of the surface protection layer 1353 is less than 5 μm, there is a problem in that external insulation is reduced. In contrast, if the thickness of the surface protection layer 1353 is greater than 25 μm, since the total thickness of the pouch may be increased, the energy density to volume of the secondary battery 1 may be rather reduced.

PET is inexpensive, has excellent durability, and has excellent electrical insulation properties, but has weak adhesion to aluminum which is frequently used as the gas barrier layer 1352, and the PET and the aluminum have different behaviors from each other when they are stretched under stress. Thus, if the surface protection layer 1353 and the gas barrier layer 1352 are directly adhered, the surface protection layer 1353 and the gas barrier layer 1352 may be delaminated during drawing. As a result, since the gas barrier layer 1352 may not be stretched uniformly, the formability may be reduced.

According to an embodiment of the present invention, the battery case 13 may further include the drawing assistance layer 1354 which is formed of a third polymer and is laminated between the surface protection layer 1353 and the gas barrier layer 1352. The drawing assistance layer 1354 is laminated between the surface protection layer 1353 and the gas barrier layer 1352 to prevent the surface protection layer 1353 and the gas barrier layer 1352 from being delaminated during stretching. The third polymer for preparing the drawing assistance layer 1354 may be at least one material selected from the group consisting of polyethylene, polypropylene, polycarbonate, polyethylene terephthalate, polyvinyl chloride, acrylic polymer, polyacrylonitrile, polyimide, polyamide, cellulose, aramid, Nylon, polyester, polyparaphenylene benzobisoxazole, polyarylate, Teflon, and glass fibers. Particularly, since a Nylon resin is easy to adhere to the polyethylene terephthalate (PET) of the surface protection layer 1353 and has a similar behavior to the aluminum alloy of the gas barrier layer 1352 when stretched, it is desirable that the Nylon resin is mainly used as the third polymer. The drawing assistance layer 1354 may have a single-layer structure formed of any one material or may have a composite layer structure which is formed by layering two or more materials, respectively.

Conventionally, the gas barrier layer 1352 had a thickness of about 40 μm, and, accordingly, the drawing assistance layer 1354 had a considerably small thickness of about 15 μm. That is, a thickness ratio of the drawing assistance layer 1354 to the gas barrier layer 1352 was 1:2.67, wherein the thickness ratio of the gas barrier layer 1352 was considerably high. However, as described above, according to an embodiment of the present invention, since the gas barrier layer 1352 has a thickness of about 50 μm to about 70 μm, particularly, 55 μm to 65 μm, the formability of the gas barrier layer 1352 is improved. In this case, in order to also improve formability of the drawing assistance layer 1354, the drawing assistance layer 1354 may have a thickness of 20 μm to 50 μm, preferably 25 μm to 38 μm, and more preferably 27 μm to 35 μm. If the thickness is less than 20 μm, since the drawing assistance layer 1354 may not match the improved formability of the gas barrier layer 1352, it may be broken during stretching. In contrast, if the thickness is greater than 50 μm, since the total thickness of the pouch may be increased, the volume of the secondary battery 1 may be increased and the energy density may be reduced. Particularly, according to an embodiment of the present invention, the thickness ratio of the drawing assistance layer 1354 to the gas barrier layer 1352 may be less than 1:2.5. That is, the thickness ratio of the drawing assistance layer 1354 may be further increased than that of the conventional case. However, since the total thickness of the pouch is increased when the thickness of the drawing assistance layer 1354 is excessively increased, it is desirable that the thickness ratio is greater than 1:1.5. That is, the thickness ratio may be in a range of 1:1.5 to 1:2.5, preferably 1:1.7 to 1:2.3, and more preferably, 1:1.8 to 1:2.1.

The pouch film laminate according to the present invention may have a total thickness of 160 μm to 200 μm, for example, 180 μm to 200 μm. When the thickness of the pouch film laminate satisfies the above range, the forming depth may be increased while minimizing a reduction of the sealing durability and a decrease in battery accommodation space due to an increase in the thickness of the pouch film laminate.

The pouch film laminate according to the present invention has excellent tensile strength and elongation. Specifically, the pouch film laminate according to the present invention may have a tensile strength, which is measured while the pouch film laminate is pulled at a tensile speed of 50 mm/min after being cut to a size of 15 mm×80 mm, of 200 N/15 mm to 300 N/15 mm, preferably 210 N/15 mm to 270 N/15 mm, and more preferably 220 N/15 mm to 250 N/15 mm, and may have an elongation of 120% to 150%, preferably 120% to 140%, and more preferably 120% to 130%. As described above, since the pouch film laminate according to the present invention has high tensile strength and elongation and, as a result, the toughness is increased, the occurrence of cracks is less likely even when the forming depth is large during cup forming.

Since formability of the pouch type battery case 13 prepared by forming the pouch film laminate 135 is improved, the cup portion 133 may be formed more deeply, the outer wall of the cup portion 133 may be close to vertical, and the radius of curvature of the edge of the cup portion 133 may also be reduced, and thus, the larger and thicker electrode assembly 10 may also be accommodated. Therefore, the energy efficiency to volume of the secondary battery 1 prepared by using the battery case 13 may be increased.

Hereinafter, the present invention will be described in more detail, according to specific examples.

Example 1

A pouch film laminate having a structure of PET/Nylon/ aluminum alloy thin film/CPP was prepared by stacking a Nylon film having a width of 266 mm, a length of 50 m, and a thickness of 25 μm and a polyethylene terephthalate (PET) film having a width of 266 mm, a length of 50 m, and a thickness of 12 μm on one surface of an AA8021 aluminum (Al) alloy thin film having a width of 266 mm, a length of 50 m, and a thickness of 60 μm and having a grain size of 11.6 μm, and stacking casted polypropylene (CPP) having a width of 266 mm, a length of 50 m, and a thickness of 80 μm on the other surface thereof.

In this case, the Nylon film and the PET film were bonded by a dry lamination method using a urethane adhesive, and the casted polypropylene (CPP) was stacked by being melted at a high temperature and then co-extruded on an aluminum (Al) alloy. Herein, the aluminum (Al) alloy was a gas barrier layer, the PET was a surface protection layer, the Nylon was a drawing assistance layer, and the CPP was a sealant layer.

Example 2

A pouch film laminate was prepared in the same manner as in Example 1 except that a Nylon film having a thickness of 30 μm was used as a drawing assistance layer and a polyethylene terephthalate (PET) film having a thickness of 7 μm was used as a surface protection layer.

Example 3

A pouch film laminate was prepared in the same manner as in Example 1 except that a Nylon film having a thickness of 25 μm was used as a drawing assistance layer and a polyethylene terephthalate (PET) film having a thickness of 7 μm was used as a surface protection layer.

Comparative Example 1

A pouch film laminate was prepared in the same manner as in Example 1 except that an aluminum alloy thin film having a thickness of 40 μm was used as a gas barrier layer, a Nylon film having a thickness of 15 μm was used as a drawing assistance layer, and a sealant layer was formed to a thickness of 80 μm.

Comparative Example 2

A pouch film laminate was prepared in the same manner as in Example 1 except that an aluminum alloy thin film having a thickness of 80 μm was used as a gas barrier layer and a sealant layer was formed to a thickness of 60 μm.

Comparative Example 3

A pouch film laminate was prepared in the same manner as in Example 1 except that an AA8079 aluminum (Al) alloy thin film having a thickness of 60 μm and a grain size of 16.8 μm was used as a gas barrier layer.

Comparative Example 4

A pouch film laminate was prepared in the same manner as in Example 1 except that an AA8079 aluminum (Al) alloy thin film having a thickness of 80 μm and a grain size of 16.8 μm was used as a gas barrier layer and a sealant layer was formed to a thickness of 60 μm.

Comparative Example 5

A pouch film laminate was prepared in the same manner as in Example 1 except that an AA8079 aluminum (Al) alloy thin film having a thickness of 80 μm and a grain size of 16.8 μm was used as a gas barrier layer.

Comparative Example 6

A pouch film laminate was prepared in the same manner as in Example 1 except that an AA8079 aluminum (Al) alloy thin film having a thickness of 40 μm and a grain size of 16.8 μm was used as a gas barrier layer and a Nylon film having a thickness of 15 μm was used as a drawing assistance layer.

Comparative Example 7

A pouch film laminate was prepared in the same manner as in Example 1 except that an aluminum alloy thin film having a thickness of 50 μm was used as a gas barrier layer and a sealant layer was formed to a thickness of 60 μm.

TABLE 1

| | Surface protection layer | | Drawing assistance layer | | Gas barrier layer | | Sealant layer | | Thickness ratio of drawing assistance layer:gas barrier layer |
| | Material | Thickness (μm) | Material | Thickness (μm) | Grain size (μm) | Thickness (μm) | Material | Thickness (μm) | |
|---|---|---|---|---|---|---|---|---|---|
| Example 1 | PET | 12 | Nylon | 25 | 11.6 | 60 | CPP | 80 | 1:2.4 |
| Example 2 | PET | 7 | Nylon | 30 | 11.6 | 60 | CPP | 80 | 1:2 |
| Example 3 | PET | 7 | Nylon | 25 | 11.6 | 60 | CPP | 80 | 1:2.4 |
| Comparative Example 1 | PET | 12 | Nylon | 15 | 11.6 | 40 | CPP | 80 | 1:2.67 |
| Comparative Example 2 | PET | 12 | Nylon | 25 | 11.6 | 80 | CPP | 60 | 1:3.2 |
| Comparative Example 3 | PET | 12 | Nylon | 25 | 16.8 | 60 | CPP | 80 | 1:2.4 |
| Comparative Example 4 | PET | 12 | Nylon | 25 | 16.8 | 80 | CPP | 60 | 1:3.2 |
| Comparative Example 5 | PET | 12 | Nylon | 25 | 16.8 | 80 | CPP | 80 | 1:3.2 |
| Comparative Example 6 | PET | 12 | Nylon | 15 | 16.8 | 40 | CPP | 80 | 1:2.67 |
| Comparative Example 7 | PET | 12 | Nylon | 25 | 11.6 | 50 | CPP | 60 | 1:2 |

Experimental Example 1: Grain Size Measurement

Cross sections in a thickness direction of the aluminum alloy thin films respectively used as the gas barrier layers in Example 1 and Comparative Example 3 were observed with a scanning electron microscope (SEM) to measure grain sizes. In this case, after measuring maximum diameters of 30 grains observed in cross-sectional SEM images in the thickness direction of the aluminum alloy thin films which were obtained using a scanning electron microscope, the grain size was measured by a method of calculating an average value thereof.

The SEM image of the AA8021 aluminum alloy thin film used in Example 1 and the SEM image of the AA8079 aluminum alloy thin film used in Comparative Example 3 are illustrated in FIG. 5. As a result of measuring grain sizes based on the illustrated SEM images, the grain size of AA8021 used in Example 1 was 11.6 μm and the grain size of AA8079 used in Comparative Example 3 was 16.8 μm.

Experimental Example 2: Formability Evaluation

After cutting each of the pouch film laminates prepared in Examples 1 to 3 and Comparative Examples 1 to 7 to the same size of 90 mm×150 mm, forming was performed while changing a forming depth in each of a battery case forming device having one forming part with a size of 32 mm in width×55 mm in length and a battery case forming device having two forming parts. The forming depth at which cracks occurred in each sample was recorded. Herein, corners and edges of a punch and the forming part of the battery case forming device were filleted, the corner of the punch had a curvature of 2 mm, the edge thereof had a curvature of 1 mm, the corner of the forming part had a curvature of 2.3 mm, and the edge thereof had a curvature of 1 mm. In addition, clearance of the punch and the forming part was 0.3 mm. In the battery case forming device having two forming parts, a distance between the two forming parts was 1 mm.

Measurement results are presented in [Table 2] below.

TABLE 2

| | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Total thickness (μm) | 183 | 183 | 178 | 153 | 183 | 183 | 183 | 203 | 153 | 153 |
| Forming depth of 1 cup portion (mm) | 15 | 17 | 16 | 9 | 15 | 13.5 | 13 | 14 | 8.5 | 12 |
| Forming depth of 2 cup portions (mm) | 10.2 | 11.2 | 10.9 | 6.5 | 9.8 | 9.0 | 8.5 | 8.0 | 6.9 | 7.8 |

As listed in Table 2, with respect to the pouch film laminates of Examples 1 to 3 in which the grain size of the Al alloy thin film and the thicknesses of the gas barrier layer and the sealant layer satisfied the ranges of the present invention, formability of one cup and formability of two cups were better than those of Comparative Examples 1 to 7.

With respect to the pouch film laminate according to Comparative Example 2, the forming depth of one cup portion was similar to that of Example 1, but it may be confirmed that the formability was reduced during forming of two cup portions.

Experimental Example 3: Evaluation of Tensile Strength and Elongation

After cutting 5 samples of each of the pouch film laminates prepared in Examples 1 and 2 and Comparative Examples 1 to 7 to the same size of 15 mm×80 mm, each of the samples was fixed to a lower jig of a tensile strength tester (manufacturer: Shimadzu, model: AGX-V). In addition, after fixing each sample with an upper jig to a point of 30 mm from a top end, the samples were elongated by moving the upper jig away from the lower jig at a speed of 50 mm/min. Then, tensile strength and elongation were measured accordingly. Measurement results are presented in [Table 3] and [Table 4] below.

is to be understood that the invention has been described by way of illustration and not limitation. Thus, the scope of the invention is defined by the following claims rather than the foregoing detailed description, and it is to be interpreted that all changes or modifications derived from the meaning, scope and equivalent concept of the appended claims are within the scope of the present invention.

| <Description of the Reference Numerals> | |
|---|---|
| 1: Secondary Battery | 10: Electrode Assembly |
| 11: Electrode Tab | 12: Electrode Lead |
| 13: Battery Case | 14: Insulation Portion |
| 111: Positive Electrode Tab | 112: Negative Electrode Tab |
| 121: Positive Electrode Lead | 122: Negative Electrode Lead |
| 131: First Case | 132: Second Case |
| 133: Cup Portion | 134: Sealing Portion |
| 135: Pouch Film Laminate | 1331: Accommodation Space |
| 1351: Sealant Layer | 1352: Gas Barrier Layer |
| 1353: Surface Protection Layer | 1354: Drawing Assistance Layer |

The invention claimed is:

1. A pouch film laminate comprising:

a sealant layer formed of a first polymer as an innermost layer;

a surface protection layer formed of a second polymer as an outermost layer;

TABLE 3

| | Example 1 | | Example 2 | | Comparative Example 1 | | Comparative Example 2 | |
|---|---|---|---|---|---|---|---|---|
| | Tensile strength (N/15 mm) | Elongation (%) | Tensile strength (N/15 mm) | Elongation (%) | Tensile strength (N/15 mm) | Elongation (%) | Tensile strength (N/15 mm) | Elongation (%) |
| 1 | 244 | 129 | 234 | 149 | 158 | 101 | 234 | 112 |
| 2 | 253 | 150 | 233 | 150 | 164 | 127 | 238 | 104 |
| 3 | 248 | 141 | 235 | 150 | 163 | 113 | 234 | 102 |
| 4 | 244 | 135 | 227 | 132 | 162 | 108 | 241 | 119 |
| 5 | 248 | 142 | 234 | 150 | 163 | 120 | 228 | 98 |
| Average | 247.2 | 139.2 | 232.8 | 146.2 | 162.0 | 133.7 | 235.0 | 107.0 |

TABLE 4

| | Comparative Example 3 | | Comparative Example 4 | | Comparative Example 5 | | Comparative Example 6 | | Comparative Example 7 | |
|---|---|---|---|---|---|---|---|---|---|---|
| | Tensile strength (N/15 mm) | Elongation (%) | Tensile strength (N/15 mm) | Elongation (%) | Tensile strength (N/15 mm) | Elongation (%) | Tensile strength (N/15 mm) | Elongation (%) | Tensile strength (N/15 mm) | Elongation (%) |
| 1 | 239 | 128 | 222 | 102 | 234 | 113 | 159 | 109 | 198 | 96 |
| 2 | 227 | 117 | 221 | 107 | 227 | 118 | 151 | 105 | 200 | 95 |
| 3 | 237 | 126 | 221 | 103 | 231 | 107 | 158 | 110 | 201 | 108 |
| 4 | 235 | 117 | 216 | 110 | 237 | 108 | 152 | 124 | 203 | 110 |
| 5 | 230 | 113 | 219 | 102 | 232 | 110 | 146 | 109 | 201 | 107 |
| Average | 234 | 120 | 219.8 | 104.7 | 231.9 | 111.2 | 153.2 | 111.4 | 200.6 | 103.2 |

Through Tables 3 and 4, it may be confirmed that tensile strengths and/or elongations of the pouch film laminates of Examples 1 to 3 satisfying conditions of the present invention were better than those of the pouch film laminates of Comparative Examples 1 to 7.

It will be understood by those of ordinary skill in the art that various changes in form and details may be made therein without departing from the spirit and scope of the invention as defined by the following claims. Accordingly, it a gas barrier layer laminated between the surface protection layer and the sealant layer; and a drawing assistance layer formed of a third polymer and laminated between the surface protection layer and the gas barrier layer, wherein the gas barrier layer has a thickness of 50 μm to 70 μm, wherein the gas barrier layer comprises an aluminum alloy thin film, wherein the sealant layer has a thickness of 70 μm to 100 μm, and wherein a thickness ratio of the drawing assistance layer to the gas barrier layer is in a range of 1:1.5 to 1:2.5.

2. The pouch film laminate of claim 1, wherein the aluminum alloy thin film has alloy number AA8021.

3. The pouch film laminate of claim 1, wherein the aluminum alloy thin film comprises iron in an amount of 1.3 wt % to 1.7 wt %.

4. The pouch film laminate of claim 1, wherein the aluminum alloy thin film comprises silicon in an amount of 0.2 wt % or less.

5. The pouch film laminate of claim 1, wherein the gas barrier layer has a thickness of 55 μm to 65 μm.

6. The pouch film laminate of claim 1, wherein the sealant layer has a thickness of 75 μm to 85 μm.

7. The pouch film laminate of claim 1, wherein the first polymer comprises polypropylene (PP).

8. The pouch film laminate of claim 1, wherein the surface protection layer has a thickness of 5 μm to 25 μm.

9. The pouch film laminate of claim 1, wherein the surface protection layer has a thickness of 7 μm to 12 μm.

10. The pouch film laminate of claim 1, wherein the second polymer comprises polyethylene terephthalate (PET).

11. The pouch film laminate of claim 1, wherein the drawing assistance layer has a thickness of 20 μm to 50 μm.

12. The pouch film laminate of claim 11, wherein the third polymer comprises Nylon.

13. The pouch film laminate of claim 1, wherein the drawing assistance layer has a thickness of 25 μm to 38 μm.

14. The pouch film laminate of claim 1, wherein the pouch film laminate has a total thickness of 160 μm to 200 μm.

15. The pouch film laminate of claim 1, wherein the pouch film laminate has a tensile strength, which is measured while the pouch film laminate is pulled at a tensile speed of 50 mm/min after being cut to a size of 15 mm×80 mm, of 200 N/15 mm to 300 N/15 mm, and has an elongation of 120% to 150%.

16. A pouch type battery case accommodating an electrode assembly and being prepared by forming a pouch film laminate, wherein the pouch film laminate comprises:

a sealant layer formed of a first polymer as an innermost layer;

a surface protection layer formed of a second polymer as an outermost layer;

a gas barrier layer laminated between the surface protection layer and the sealant layer; and a drawing assistance layer formed of a third polymer and laminated between the surface protection layer and the gas barrier layer, wherein the gas barrier layer has a thickness of 50 μm to 70 μm, wherein the gas barrier layer comprises an aluminum alloy thin film, wherein the sealant layer has a thickness of 70 μm to 100 μm, and wherein a thickness ratio of the drawing assistance layer to the gas barrier layer is in a range of 1:1.5 to 1:2.5.

17. A pouch type secondary battery comprising an electrode assembly which is formed by stacking a positive electrode, a separator, and a negative electrode; and a pouch type battery case accommodating the electrode assembly, wherein the battery case is prepared by forming a pouch film laminate, wherein the pouch film laminate comprises:

a sealant layer formed of a first polymer as an innermost layer;

a surface protection layer formed of a second polymer as an outermost layer;

a gas barrier layer laminated between the surface protection layer and the sealant layer; and a drawing assistance layer formed of a third polymer and laminated between the surface protection layer and the gas barrier layer, wherein the gas barrier layer has a thickness of 50 μm to 70 μm, wherein the gas barrier layer comprises an aluminum alloy thin film, wherein the sealant layer has a thickness of 70 μm to 100 μm, and wherein a thickness ratio of the drawing assistance layer to the gas barrier layer is in a range of 1:1.5 to 1:2.5.

* * * * *